United States Patent [19]
Dewey et al.

[11] 3,890,427
[45] June 17, 1975

[54] RECOVERY OF GALLIUM

[75] Inventors: John L. Dewey, Little Rock; George W. Cook, Benton; Charles E. Scott, Little Rock, all of Ark.

[73] Assignee: Reynolds Metals Company, Richmond, Va.

[22] Filed: Mar. 28, 1974

[21] Appl. No.: 455,519

[52] U.S. Cl. ............... 423/129; 423/118; 423/121; 423/122; 423/624; 423/131; 204/105
[51] Int. Cl. ............................................ C01g 15/00
[58] Field of Search ........... 423/118, 122, 124, 624, 423/129, 127, 131

[56] References Cited
UNITED STATES PATENTS

| | | | |
|---|---|---|---|
| 2,574,008 | 11/1951 | Beja | 423/127 X |
| 2,582,378 | 1/1952 | Brown | 423/127 X |
| 2,598,777 | 6/1952 | Frary | 423/131 X |
| 2,962,370 | 11/1960 | Foster et al. | 423/624 X |
| 3,425,800 | 2/1969 | Hirsh | 423/124 X |

FOREIGN PATENTS OR APPLICATIONS

| | | | |
|---|---|---|---|
| 1,079,718 | 12/1954 | France | 423/131 |
| 987,224 | 3/1965 | United Kingdom | 423/131 |

OTHER PUBLICATIONS

Hudson, "Journal of Metals", Sept. 1965, pp. 948–951.

*Primary Examiner*—Herbert T. Carter
*Attorney, Agent, or Firm*—Glenn, Palmer, Lyne & Gibbs

[57] ABSTRACT

A process for the recovery of gallium from solutions containing the same in admixture with aluminum and caustic which comprises adding silica or silica and alumina to such solutions to selectively precipitate both aluminum and caustic and leave the substantial portion of the gallium in solution where it is then recovered by electrolytic techniques.

8 Claims, No Drawings

RECOVERY OF GALLIUM

BACKGROUND OF THE INVENTION

There has been considerable interest by prior art workers in developing a process for the recovery of gallium from solutions containing the same in admixture with aluminum and caustic. It is well known that gallium is present in small concentrations in various alumina-bearing materials. Bauxite usually contains a few hundredths of a percent of gallium oxide by weight. Coal ash sometimes contains as much as a few tenths of a percent of gallium oxide, as well as substantial amounts of alumina, lime, silica, magnesia, iron oxide, and titania. Also, the fine dust or "fume" evolved from the electrolytic cells for the production of aluminum by reduction of alumina dissolved in a fluoride electrolyte usually contains a few hundredths of a percent of gallium oxide, together with considerably larger amounts of alumina, carbon, soda, lime, iron oxide, sulfur, silica, and fluorides.

Likewise, in various processes for the recovery of gallium values gallium oxide "concentrates" are produced in which the proportion of gallium oxide is less than one percent, and is quite small as compared with the proportion of alumina in the concentrate. For example, in the primary commercial process for producing gallium in the United States, Bayer process liquor from the caustic digestion of bauxite, and from which a substantial portion of the alumina has previously been precipitated, is gassed with carbon dioxide to a co-precipitate alumina and gallium oxide, after which the co-precipitate is dissolved in caustic soda solution. The co-precipitate contains about 0.3 to 0.5 percent by weight of gallium oxide ($Ga_2O_3$), together with much larger amounts of alumina, silica, and soda ($Na_2O$), as well as potassium oxide, lime, and iron oxide.

Although the gallium content in the various materials mentioned above is generally assumed to be in the form of gallium sesquioxide, the exact nature of the gallium values is not fully known. They may be present as other compounds than the sesquioxide, such as complexes with other compounds. However, for convenience the gallium values in such materials will be referred to herein as gallium oxide.

Recovery of gallium oxide from such materials has been made difficult and expensive by the small concentration of gallium oxide present, and by the intimate association therewith of substantial proportions of alumina, silica, lime, iron oxide, titania, soda, and other compounds. Alumina and gallium oxide have marked similarities which make it particularly difficult to recover gallium oxide from materials containing a large concentration of alumina.

A good review of the problems associated with gallium recovery appears in an article entitled "Gallium as a By-Product of Alumina Manufacture", L. K. Hudson, Journal of Metals, September 1965, pages 948–51.

DESCRIPTION OF THE INVENTION

It has now been discovered that solutions containing gallium, aluminum and caustic with or without other impurities can be treated in accordance with the teachings of this invention so as to increase the gallium to aluminum ratio in said solutions while simultaneously decreasing the caustic to gallium ratio. The resulting solution can then be concentrated by evaporation to yield solutions having a gallium concentration many times that achievable by the processes of the prior art. Gallium is thereafter recovered from said solutions by conventional electrolytic techniques.

The instant invention results in significant advantages since the gallium-containing solutions which are electrolyzed have a gallium concentration many times that achievable by the best of the prior art processes, thereby resulting in enhanced current efficiency as well as many other obvious benefits stemming from use of more concentrated solutions such as having less solution to electrolyze in order to obtain a given amount of gallium. In fact, by the process of this invention, it is possible to obtain electrolysis liquors containing at least about 8–10 grams of gallium/kg. of liquor, whereas prior art methods typically produced gallium concentrations in the order of 1–2 grams of gallium/kg. of liquor. Additionally, the weight ratio of gallium to alumina in the electroylsis liquor is at least 0.9:10 and preferably higher.

The novel process of this invention is based upon the discovery that if a caustic solution containing both aluminum and gallium, e.g. a Bayer liquor, is reacted with a source of silica, an aluminosilicate will be produced by the reaction of caustic, alumina and silica in a manner well known in the art but that surprisingly, gallium will be substantially unaffected and will remain in solution. Thus, silica selectively reacts with alumina and caustic in preference to gallium for reasons which are not completely understood.

It is immediately apparent that the process of this invention provides a very practical and convenient means for enhancing the gallium concentration of caustic solutions thereof in admixture with aluminum in a manner which reduces both the aluminum and caustic values of said solution and enables the solution to be concentrated in gallium by removing water therefrom.

It is to be immediately understood that the instant applicants are not claiming to be the first to have discovered that a caustic solution containing aluminum, e.g. a Bayer liquor, could be reacted with a source of silica in order to form a product such as sodium aluminosilicate zeolite. Teachings of this type are well known in the art in the zeolite field and a representative teaching can be found in U. S. Pat. No. 3,425,800. What is surprising in connection with the above referred-to reaction is that the alumina and caustic will preferentially react with the silica as opposed to the gallium, thereby resulting in an effective process for the separation of a substantial amount of alumina and caustic from a solution thereof with gallium.

Thus, the novel process of this invention resides in treating a caustic solution containing gallium and aluminum in order to form a precipitate of an aluminosilicate product, separating said precipitate and concentrating the remaining solution by evaporation.

The manner in which the aluminosilicate is formed from the caustic solutions containing both gallium and aluminum depends on the caustic to alumina ratios thereof. When a solution has a caustic-to-alumina ratio of about 1:1, silica is added in an amount equal to about 2 moles of silica for each mole of alumina which is desired to be removed. When the caustic solution has a caustic-to-alumina ratio in excess of about 1, then alumina must also be added in an amount which is sufficient to bring the caustic-to-alumina ratio down to about 1 or lower and silica is added in an amount equal to about 2 moles of silica for each mole of $Na_2O$ which is desired to be removed.

In the latter situation, the silica and alumina can be added as individual compounds or in the form of a mixture such as clay, either raw or calcined. Kaolin clay is a typical clay comprising about 2 moles silica per mole alumina which can be used but any clay is operable, either by itself or in admixture with additional silica. All that is necessary is that sufficient silica and alumina be provided in accordance with the parameters above set forth. It is also understood that if all the required silica is supplied as kaolin clay, a portion of the alumina originally in solution will precipitate as alumina hydrate but such will have no significant bearing on the ability to recover gallium.

After the addition of the silica or silica and alumina to the caustic solution, it is simply heated at temperatures ranging from about 212°F to about 400°F at autogenous (atmospheric or superatmospheric, respectively) pressure until the easily filterable aluminosilicate product is formed. This can take anywhere from about 5–10 minutes up to 10 hours depending upon the reaction conditions and the particular source of silica. Within the reaction conditions above described, the aluminosilicate product has substantially the following formula, expressed in terms of ratios of mole oxides:

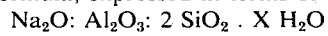
$Na_2O: Al_2O_3: 2 SiO_2 \cdot X H_2O$ wherein X ranges from about 2 to 5.

It is to be immediately understood that other reaction conditions can be chosen to produce aluminosilicates having higher silica to alumina ratios by conventional techniques such as set forth in U.S. Pat. No. 3,425,800 but usually a longer period of time is necessary for the aluminosilicate to form.

As has heretofore been pointed out in accordance with the novel process of this invention, about two moles of silica are added for each mole of alumina which is desired to be removed from the caustic solution. The amount of alumina desired to be removed can obviously vary over a wide range, but the more alumina that is removed the more concentrated the solution can be made with respect to gallium content upon evaporation. Although it is theoretically possible to remove all the alumina which is present in the caustic solutions, nevertheless, it has been found that attempts to remove more than 98 percent of the alumina result in substantial gallium losses. Thus, as a practical matter, it is preferred to remove from 50–98 percent of the total alumina which is present in the caustic solution and even more desirably, to remove from about 90–98 percent of the total alumina present in the caustic solution by reaction of the same with silica. The above also applies in connection with those caustic solutions which have a sodium oxide to alumina ratio greater than one. As pointed out earlier, in dealing with solutions of this type, it is necessary to add both silica and alumina and such can be done by adding these materials as pure compounds or in a suitable mixture such as clay. To help in understanding the reaction which is carried out in a situation of this type, it is easier to visualize that two reactions are taking place, although the reactions take place simultaneously. Thus, in a situation where a caustic solution contains a sodium oxide to alumina concentration greater than one, it could be visualized as merely adding sufficient silica to remove 50-98 percent of the alumina which was present and then adding clay to remove the excess soda.

As has previously been pointed out, the novel process of this invention is directed towards the production of concentrated gallium solutions which can then be fed to an electrolytic cell in order to recover gallium by conventional electrolytic techniques. One of the dangers to be avoided in the electrolytic processing of these gallium solutions is the deposition of a scale on the electrolytic cell which is caused by the precipitation of alumina. Another way of expressing the same thing is to state that stable solutions should be employed such that alumina does not precipitate during the electrolytic process.

The above causes concern especially when Bayer liquors are employed since these liquors usually contain carbon dioxide as a result of their processing in the Bayer process. Thus, when a Bayer liquor is treated in accordance with the novel process of this invention, it might very well be that after the sodium and aluminum has been removed by reaction of the same with silica that not enough free soda remains in solution to prevent the residual alumina from precipitating out. As indicated earlier, it is undesirable that this precipitation of alumina should take place in the electrolytic cell since this can cause scaling on the electrolytic plates. One convenient method of handling this problem is merely to let the alumina precipitate out and filter the same from the solution and then pass the solution to the electrolytic cell. However, a more preferred solution to the problem is to add calcium oxide or slaked lime so as to form calcium carbonate with any carbon dioxide which is present in the liquor or even to add sodium hydroxide such that the total mole ratio of free soda to alumina of the solution which is fed to the electrolytic cell is at least 2:1.

A particularly preferred embodiment of this invention resides in the pretreatment of a Bayer liquor in accordance with conventional techniques followed by treatment with silica in order to precipitate an aluminosilicate product, separating the precipitate and recovering a gallium solution which can be evaporated to provide solutions of high gallium concentration.

In a situation of this type, a spent Bayer liquor is subjected to a two-stage carbonation treatment in accordance with the techniques fully set forth in U.S. Pat. No. 2,574,008. In this embodiment, the spent Bayer liquor is first subjected to a carbonation treatment which is carried out in a slow or gradual manner in order to precipitate approximately 90 percent of the alumina without substantially affecting the gallium content. The remaining solution is thereafter subjected to a rapid carbonation treatment which precipitates both the aluminum and the gallium together. This precipitate is then calcined to drive off organic matter and $CO_2$ and dissolved in water to yield a solution having a $Na_2O$ to $Al_2O_3$ ratio of about 1. As indicated earlier, the solution may still have some $CO_2$ present although most of it is removed during the calcination treatment. This excess $CO_2$, if any, can be removed by treatment with lime.

The resulting solution containing gallium, aluminum and caustic is thereafter reacted with silica in the manner above described in order to selectively precipitate the sodium and aluminum and to leave the gallium substantially unaffected. As indicated earlier, the precipitated product is an aluminosilicate which is removed by filtration or decantation and the resulting solution is then concentrated by evaporative techniques and fed to an electrolytic cell.

The silica which is employed in the novel process of this invention includes truly amorphous silicas such as Hi-sil 404 (a product of the PPG Industries, Inc.), dried silica gel, calcined diatomaceous earth, finely ground quartz, sand, as well as other commercially available silicas, such as Novali which is a product of the Arby Industrial Minerals Company and IM-1160, a product of the Illinois Minerals Company.

The process of this invention therefore provides a very convenient and practical manner for the separation of gallium from solutions thereof with aluminum and caustic by the simple expedient of reacting the same with silica or silica and alumina. Although it has been theoretically possible to produce high gallium-containing solutions, according to the techniques of the prior art, the simple fact remains that no such process has ever found commercial acceptance because of the extraordinary time and expense that such theoretical processes would take. Thus, for example, in U.S. Pat. No. 2,574,008, there is visualized that the repetition of the cycle of slow carbonation, followed by rapid carbonation will continue to increase the amount of gallium present in the ultimate solution. This is true. However, that process is so impractical because of the inordinate amount of time it would take and the expense it would involve that it has never been used commercially. Thus, as indicated earlier, it is possible to take a spent Baker liquor, i.e., one wherein aluminum hydroxide has been precipitated therefrom and thereafter to subject this liquor to a slow carbonation in order to precipitate about 90 percent of the available aluminum without substantially affecting the gallium, removing the precipitated aluminum, treating the remaining solution by a fast carbonation technique in order to simultaneously precipitate both aluminum and gallium, taking this precipitate, redissolving it in alkali, subjecting it again to slow carbonation in an attempt to selectively remove a portion of the alumina present, separating out the precipitate, subjecting the solution to a rapid carbonation technique in order to coprecipitate both the aluminum and gallium and so on, in constant repetition of the cycle. This technique has not proven to be economical or practical so that in actual fact only the first two carbonation steps are employed and then the resulting liquor is subjected to electrolysis in order to recover gallium.

The novel process of this invention has significant advantages over the prior art techniques, either as they are actually practiced or as is theoretically possible to practice. With respect to the former, the novel process of this invention provides for solutions which are fed to an electrolytic cell having a significantly higher proportion of gallium than the prior art techniques. With regard to the latter, the novel process of this invention allows for the preparation of high gallium-containing solutions in a simple and inexpensive manner. The following examples will now illustrate the best mode contemplated for carrying out the novel process of this invention.

EXAMPLE 1

This example will illustrate pre-treatment of a spent Bayer liquor in accordance with the general teachings of prior art.

490 gallons of Bayer spent liquor comprising
| | |
|---|---|
| $Al_2O_3$ | 53.2 gm/kg |
| $Na_2O$ | 118.2 gm/kg |
| Ga | 0.15 gm/kg | and having a gallium content of 0.165 gm/liter and an alumina content of 58.5 gm/liter was reacted with gaseous $CO_2$ in an agitated tank (at 150°–180°F) until 77.1 percent of the initial $Al_2O_3$ was precipitated as alumina trihydrate. The solids were separated and discarded and the liquor portion was reacted with gaseous $CO_2$ in the same tank at about 160°F until the pH had been driven down to about 9.4. The precipitated solids were separated from the residual liquor on a Buchner filter and the filter cake was washed with about 1 volume of water per volume of wet cake. The wet cake was transferred to stainless steel pans and heated for 1 hour at 1600°F in an electric furnace. Analyses of representative samples of each stage were obtained.

| | Filter Cake dried at 110°C | Calcined Solids |
|---|---|---|
| $Al_2O_3$, gms/kg | 313.8 | 535.0 |
| $Na_2O$, gms/kg | 215.9 | 375.5 |
| $CO_2$, gms/kg | 277.3 | 33.0 |
| Ga, gms/kg | 2.8 | 4.7 |
| $SiO_2$, gms/kg | Not Run | 7.0 |
| Mol Ratio, $Na_2O/Al_2O_3$ | 1.13 | 1.15 |
| Solubility in boiling water | Nil | 99.5% |

24.8 grams of the calcined solids were dissolved in 150 ml. of hot water and an open laboratory bomb to yield a solution containing 85.8 grams per liter of alumina, 0.754 grams per liter of gallium and 60.2 grams per liter of $Na_2O$.

It can be seen that the prior art treatment of carbonation did, indeed, increase the gallium concentration of the final solution, i.e. it went from 0.165 grams per liter in the spent Bayer liquor up to 0.754 grams per liter in the treated liquor.

The prior art then added additional caustic to make the above liquor stable and then subjected the liquor to electrolysis in order to recover gallium.

It is noted that the liquor resulting from the double carbonation step contains a high content of soda, i.e., 60.2 grams per liter, and alumina, i.e., 85.8 grams per liter and it is precisely for this reason that the solution cannot be substantially further concentrated in gallium by subjecting it to evaporative techniques. The prior art long recognized that if the water content of this solution was substantially further diminished, it would seriously affect its usefulness as a feed to an electrolytic cell in order to recover gallium.

The above liquor was treated with 19.1 grams of Celite, an uncalcined diatomaceous earth product of Johns-Manville Co. comprising: 79.7 weight percent silica, 3.5 weight percent alumina, 0.6 weight percent soda, and the mixture placed in a laboratory bomb which was closed and heated at 290°F at autogenous pressure for one hour. The bomb was then cooled to about 200°F and the contents were removed and filtered on a Buchner funnel. Solids retained on the filter were washed with 190 ml. of hot water and the filtrate and wash water were combined and then evaporated in a beaker. The evaporated liquor was sampled and analyzed and found to comprise:

12 gms/liter of gallium
124 gms/liter of alumina
187 gms/liter of $Na_2O$

From the above example, it can be seen that the final solution was substantially enhanced in gallium content, whereas at the same time, the ratio of both alumina and soda to gallium was substantially decreased.

EXAMPLE 2

The process of Example 1 was repeated with the exception that 21.1 grams of Celite, as well as 0.4 grams of NaOH were added and the mixture was placed in a laboratory bomb and heated for one hour at 390°F under autogenous pressure. The cool material was filtered, the solids washed with 121 ml. of hot water and the combined filtrate and wash water were evaporated to concentrate the gallium. The results obtained were as follows:

115.6 gms/liter of alumina
23.1 gms/liter of gallium
136.6 gms/liter of $Na_2O$

From the above example, it can be seen that the final solution contained 23.1 grams per liter of gallium and 115.6 gms. per liter of alumina and 136.6 gms. per liter of sodium oxide. Thus, the final solution was enhanced in gallium and diminished in the ratio of both alumina and sodium oxide to gallium thereby rendering it an improved feed for an electrolytic process.

EXAMPLE 3

100 grams of Bayer spent liquor that assayed

| | |
|---|---|
| $Na_2O$ | 124.5 gms/kg |
| $Al_2O_3$ | 60.0 gms/kg |
| $CO_2$ | 28.2 gms/kg |
| Ga | 0.15 gms/kg | was mixed with 50 grams $H_2O$, 4.0 grams of lime (89 percent CaO) and 42.7 grams of calcined clay that had been calcined for 1 hour at 1300°F and comprised 40.0 percent $Al_2O_3$, 54.6 percent $SiO_2$. The mixture was placed in the laboratory bomb and heated at 390°F under autogenous pressure for 90 minutes. The cool material was filtered as before and the solids were washed with about 176 ml of hot water and the combined filtrate and wash water were evaporated to concentrate the gallium. The solution obtained assayed

| | |
|---|---|
| $Na_2O$ | 176.7 gms/liter |
| $Al_2O_3$ | 138.3 gms/liter |
| $CO_2$ | 19.4 gms/liter |
| Ga | 2.25 gms/liter |

EXAMPLE 4

About 5 cc of the liquor from Example 3 was placed in a small beaker and D.C. current from a battery was passed through the liquor between a platinum gauze anode and a small (about 1 sq. cm. area) platinum cathode at a rate of 0.1 amperes for 7 hours. The EMF across the cell was about 4 volts.

About 0.01 grams of liquid gallium metal was deposited on the cathode.

What is claimed is:

1. A process for treating solutions containing gallium in admixture with aluminum and caustic in order to enhance the gallium concentration which comprises:
   a. adding a source of silica sufficient to react with 50–98 percent by weight of the total soda present in said solution in an amount so as to provide 2 moles of silica per mole of soda to be reacted;
   b. adding a source of alumina if the $Na_2O : Al_2O_3$ ratio of the solution is above about 1 to lower the ratio to about 1 or lower;
   c. heating the solution at temperatures of from about 212° to about 400° so as to cause alumina and caustic to selectively react with the silica to form a precipitate and leave the substantial portion of the gallium in solution;
   d. separating the precipitate from the solution; and
   e. evaporating the solution so as to increase the gallium concentration thereof.

2. The process of claim 1 wherein the source of silica and alumina in steps (a) and (b) is clay.

3. The process of claim 1 wherein the solution from step (e) contains at least 2 moles of free soda per mole of alumina.

4. In a process for enhancing the gallium concentration of a solution containing caustic, alumina and gallium wherein said solution is treated with carbon dioxide at conditions to selectively precipitate the major portion of alumina, followed by removing the precipitate and subjecting the remaining solution to a second treatment with carbon dioxide so as to precipitate a mixture of sodium aluminum compounds and sodium gallium compounds, the improvement which comprises
   a. calcining said precipitate of aluminum and gallium compound and dissolving the same in water to provide a solution having a $Na_2O: Al_2O_3$ ratio of about 1;
   b. contacting said solution from step (a) with silica in an amount equal to about 2 moles silica per mole of alumina to be reacted at elevated temperatures of from about 212° to about 400°F so as to cause the silica to selectively react with caustic and aluminum and form a precipitate and leave the substantial portion of gallium in solution;
   c. separating said gallium solution from said precipitate; and
   d. concentrating said gallium solution by removal of water.

5. The process of claim 4 wherein the silica added in step (b) is 2 moles for every mole of alumina desired to be reacted and the alumina reacted is 50–98 weight percent.

6. The process of claim 5 wherein sufficient silica is added to react with 90–98 weight percent of the alumina present in a ratio of 2 moles of silica per mole of alumina.

7. The process of claim 5 wherein the gallium solution of step (c) contains at least 2 moles of free soda per mole of alumina.

8. The process of claim 6 wherein the gallium solution of step (c) contains at least 2 moles of free soda per mole of alumina.

* * * * *